Jan. 9, 1968 F. E. DRISCOLL 3,362,155
AXIAL FLOW SEPARATOR

Filed March 29, 1965 3 Sheets-Sheet 1

INVENTOR.
FRANCIS E. DRISCOLL
BY
George R. Powers
ATTORNEY

INVENTOR.
FRANCIS E. DRISCOLL
BY
George R. Powers
ATTORNEY

INVENTOR.
FRANCIS E. DRISCOLL
BY George R. Powers
ATTORNEY

United States Patent Office 3,362,155
Patented Jan. 9, 1968

3,362,155
AXIAL FLOW SEPARATOR
Francis Edward Driscoll, Topsfield, Mass., assignor to General Electric Company, a corporation of New York
Filed Mar. 29, 1965, Ser. No. 443,193
14 Claims. (Cl. 60—39.09)

ABSTRACT OF THE DISCLOSURE

A separator having an axially extending passageway formed therein, means adjacent its inlet for imparting swirl to a fluid stream and collection means downstream of the swirl imparting means. The collection means is formed by a pair of coaxially mounted outer annular wall members, the first of which diverges axially downstream from the swirl producing means and the second of which has an upstream end which is located downstream of the upstream end of the first. The upstream end of the second wall member is of substantially smaller diameter than the axially corresponding portion of the first wall member such that an annular extraction slot having a substantial radial extent is defined between the first and second wall members. The swirl imparted to the fluid stream results in particles of extraneous matter being forced outwardly and into the extraction slot. To remove all or a portion of the swirl from the airstream after removal of the extraneous matter, a means for removing swirl is provided downstream of the collection means.

---

This invention relates to axial flow separators for removing extraneous matter from fluid streams and, more particularly, to axial flow separators having improved means for more efficiently collecting and removing extraneous matter. The invention is particularly suited for use in aircraft installations where it is desired to remove foreign matter such as sand, dust, and water from the air stream supplied to a gas turbine engine.

Aircraft gas turbine engines are particularly susceptible to damage from foreign objects introduced into the air inlets of the engines. This problem has been most acute in the past with respect to relatively large foreign objects such as stones, gravel, birds, hail, and the like which when introduced into the engine can cause instant and massive damage. With the advent of gas turbine powered helicopters and other vertical take-off and landing (VTOL) aircraft, smaller particles of foreign matter such as sand, dust, and water have become increasingly troublesome due primarily to the conditions under which such aircraft may be operated. Because of its VTOL capability, this type of aircraft may be utilized in areas where conventional airfields are nonexistent, such as in combat zones and in other isolated areas. Helicopters and other VTOL aircraft are also especially suited for low altitude operation on both land and sea and have particular utility for certain low altitude missions including close combat support, search-and-rescue, and anti-submarine warfare. Under these and related conditions, substantial quantities of small foreign objects such as sand and dust particles and droplets of water may become entrained in the air stream supplied to the gas turbine engine. These particles, which individually have little effect on the engine, can cause very substantial damage when introduced into the engine in large quantities. For example, it has been found that the engine of a helicopter operating at low altitude in a desert environment can lose performance rapidly due to erosion of engine blading by high velocity particles. In addition to erosion, extraneous matter, particularly salt salt water, introduced into the engine in this manner can cause rapid destructive corrosion.

It is therefore desirable to provide means for separating out the particles of sand, dust, water, and the like before the air stream is supplied to the engine. To be satisfactory, it is essential that the separator chosen to provide this function be effective in removing the unwanted particles from the air stream. High efficiency is particularly desirable in an aircraft separator in view of the large quantities of air consumed by a gas turbine engine. However, high separating efficiency alone is not the only characteristic required of a separator used in conjunction with an aircraft gas turbine engine. Since the separator is an intimate part of the complete aircraft powerplant, it should not affect adversely the overall powerplant efficiency; in other words, the pressure losses in the air stream flowing through the separator should be as small as possible. In addition, the separator should be compact and lightweight since aircraft generally, and VTOL aircraft in particular, have very stringent weight limitations. Finally, it should have the above characteristics without being excessively complicated and expensive, both to manufacture and to maintain.

It is thus a primary object of this invention to provide an improved separator for efficiently removing extraneous matter from a fluid stream.

Another object of this invention is to provide a separator which is highly effective in removing extraneous matter from a fluid stream without causing excessive pressure losses in the fluid stream.

Still another object is to provide a lightweight and compact separator for effectively removing small particles of sand, dust, water, and the like from the air stream supplied to an aircraft gas turbine engine.

A further object is to provide for a gas turbine engine a separator which is efficient in removing particles of sand, dust, water, and the like from the entering air stream without causing excessive pressure losses in the air stream.

A still further object is to provide a separator capable of effectively removing small foreign objects from a fluid stream over a broad range of operating conditions.

Yet another object is to provide a separator capable of attaining the above objects without being excessively complicated and expensive.

Briefly stated, in carrying out the invention in one form, a separator having an axially extending passageway formed therein has means adjacent its inlet for imparting swirl to a fluid stream and collection means downstream of the swirl producing means. The collection means is formed by outer wall members comprising a first annular wall member diverging axially downstream from the swirl producing means and a second annular wall member coaxially mounted with respect to the first wall member. The upstream end of the second wall member is located downstream of the upstream end of the first wall member and is of substantially smaller diameter than the axially corresponding portion of the first wall member such that an annular extraction slot having substantial radial extent is defined between the first and second wall members. As a result of the swirl imparted to the fluid stream, particles of extraneous matter are forced outwardly and enter the extraction slot. If it is desired to remove all or a portion of the swirl from the air stream after the extraneous matter is removed, means may be provided downstream of the collection means for removing the swirl.

By a further aspect of the invention, the first wall member may have a characteristic contour such that it is a focusing wall which will direct extraneous matter striking it into the annular extraction slot. For a similar purpose, the first wall member may be formed of an energy absorbing material to deaden the bounce of particles striking it. Also in accordance with the invention, the swirl producing and removing means may be adjustable so as to provide effective operation over a broad range of conditions, including conditions under which no separation is required.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

Figure 1:
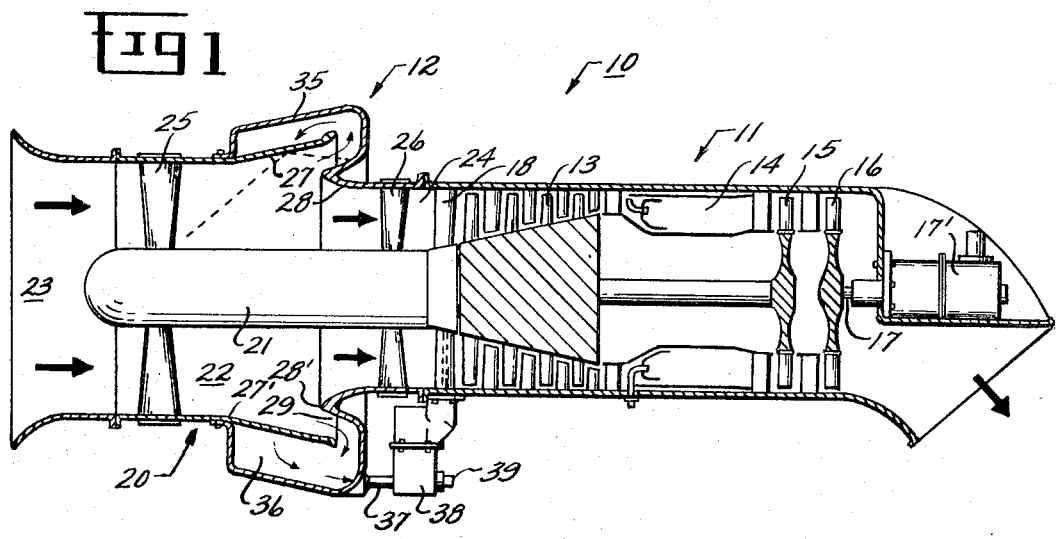
FIG. 1 is a cross sectional view of a gas turbine engine of the turboshaft type having a separator formed in accordance with the present invention mounted thereon.

With reference to FIG. 1, a gas turgine engine assembly 10 is illustrated, the assembly 10 including a gas turbine engine 11 of the turboshaft type and an axial flow separator 12 formed in accordance with the present invention. The engine 11 includes in axially spaced serial flow arrangement a compressor 13, an annular combustor 14, a gas generator turbine 15 for driving the compressor 13, and a power turbine 16 driving an output shaft 17. The turboshaft engine 11 illustrated is particularly suited for helicopter applications in which the helicopter rotor (not shown) is driven by the output shaft 17 through suitable speed reduction means 17'. As this description proceeds, however, it will become obvious to those skilled in the art that the separator may be used in conjunction with turbojet and turboprop engines as well as turboshaft engines since the separator is essentially suited for all forms of turbine engines.

Figure 2:
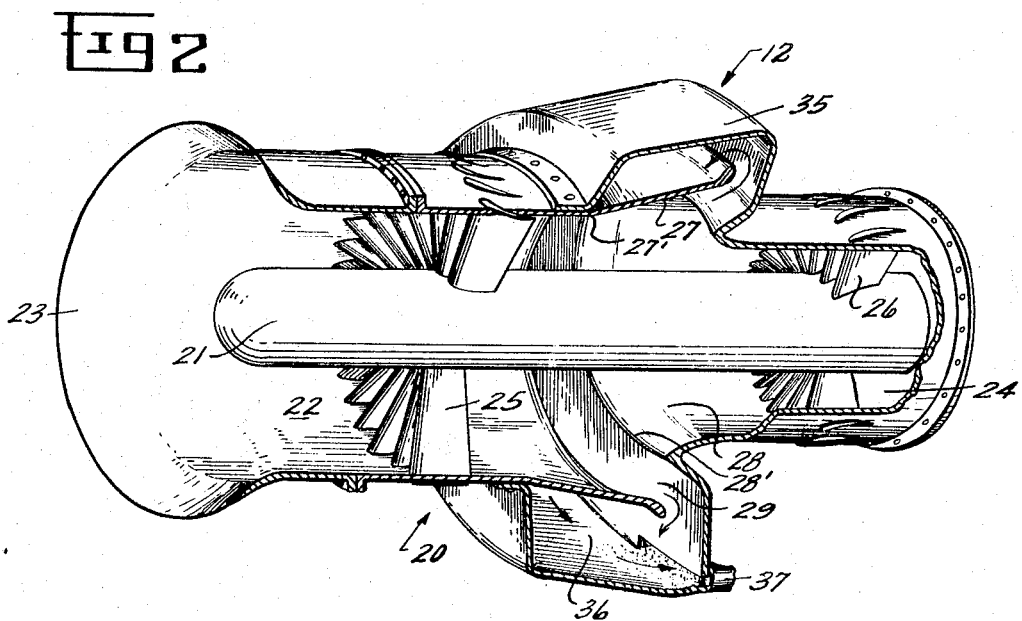
FIG. 2 is a perspective view, partially in section, of the separator of FIG. 1.

As illustrated by FIGS. 1 and 2, the separator 12 is a static component having no moving parts. More particularly, the separator 12 has an outer housing indicated generally by the numeral 20 and an inner fairing 21 defining therebetween an axially extending annular passageway 22 having at opposite ends thereof an annular inlet 23 and an annular outlet 24 communicating with the compressor inlet guide vanes 18. A row of circumferentially spaced radially extending turning vanes 25 is located adjacent the inlet 23, the vanes 25 having a desired turning configuration which will be described presently. Another row of circumferentially spaced radially extending vanes 26 is located adjacent the outlet 24, the vanes 26 also having a required configuration. Intermediate the vanes 25 and 26 is a collection arrangement comprising a first wall member 27 and a second wall member 28 which are, in the illustrated embodiment, part of the outer housing 20. The first wall member 27, which is a frusto-conical element coaxial with the axis of the separator, diverges in the downstream direction from the vanes 25. The second wall member 28, which is a cylindrical element coaxially mounted with respect to the first wall member 27 and the separator axis, has its upstream end 28' located downstream of the upstream end 27' of the first wall member 27. The upstream end 28' of the second wall member 28 is of substantially smaller diameter than the axially corresponding portion of the first wall member 27; as a result, an annular extraction slot 29 having substantial radial extent is defined between the wall members.

During operation of the turboshaft engine 11, the low pressure area existing at the inlet to the compressor 13 causes air to flow through the annular passageway 22 at high velocity. As the air passes over the stationary turning vanes 25, it is turned circumferentially such that downstream of the vanes 25 the air stream has both angular and axial velocity. This is known as imparting "swirl" to the fluid stream. Small particles of foreign matter entrained in the air stream are also turned, this turning resulting primarily from the particles, which have small mass, being carried along with the swirling air. To assure that particles having greater mass are also turned by the turning vanes, it may be desirable to overlap adjacent vanes circumferentially so that a particle cannot pass axially between adjacent vanes without striking vane and thereby being turned. A particle entrained in the air stream and turned will have both tangential and axial velocity downstream of the turning vanes 25. In theory, a particle leaving the vanes 25 with both tangential and axial velocity and not being subject to any external forces will follow a straight line path to the outer periphery of passageway 22 at some point downstream of the vanes. In practice, however, the swirling air has a significant effect on the particle's trajectory; its actual trajectory can be compared roughly to that of a helix having increasing diameter in the downstream direction.

In the preferred practice of the present invention, the turning vanes 25 have a turning configuration which will cause the entrained extraneous matter to reach the outer periphery of the passageway 22 in the axial interval between the upstream end 27' of the first wall member 27 and the upstream end 28' of the second wall member 28. While a substantial portion of the particles will flow directly into the extraction slot 29, many particles will strike the diverging surface of the first wall member 27 and rebound therefrom. The amount of divergence is selected such that particles bouncing off the first wall member 27 will enter the annular extraction slot 29 as illustrated in FIG. 1 by a broken line representing the trajectory of a typical particle. The combination of the diverging wall and the extraction slot having substantial extent in a plane transverse to the passageway 22 provides certain advantages not heretofore available. For example, the particles of extraneous matter may reach the outer periphery of the fluid passageway 22 over a substantial axial distance and still be removed from the air stream. Also, the combination permits the use of an extraction slot having substantial radial extent without unduly restricting the fluid stream. In this respect, it will be noted that the upstream end 28' of the second wall member 28 has substantially as large a diameter as the upstream end 27' of the first wall member 27. As a result, the pressure losses in the separator are held to a minimum.

With reference still being directed to FIGS. 1 and 2, an annular scroll type casing 35 circumferentially surrounds the extraction slot 29 to form an annular storage space 36 in fluid communication with the slot. A discharge pipe 37 connects the storage space 36 to an engine driven pump 38 which draws the particles to atmosphere through a pipe 39. With the exception of the relatively small quantity of air extracted along with the foreign matter, the swirling air stream flows axially downstream of the collection means and passes over the stationary turning vanes 26 which are contoured to remove the swirl before supplying the air to the compressor inlet guide vanes 18. It was noted in the preceding paragraph that the diameter of the second wall member 28 is substantially as great as that of the upstream end 27' of the first wall member 27. It will readily occur to those skilled in the art that the slight decrease in diameter is provided primarily to accommodate the quantity of air extracted with the extraneous matter.

Figure 3:
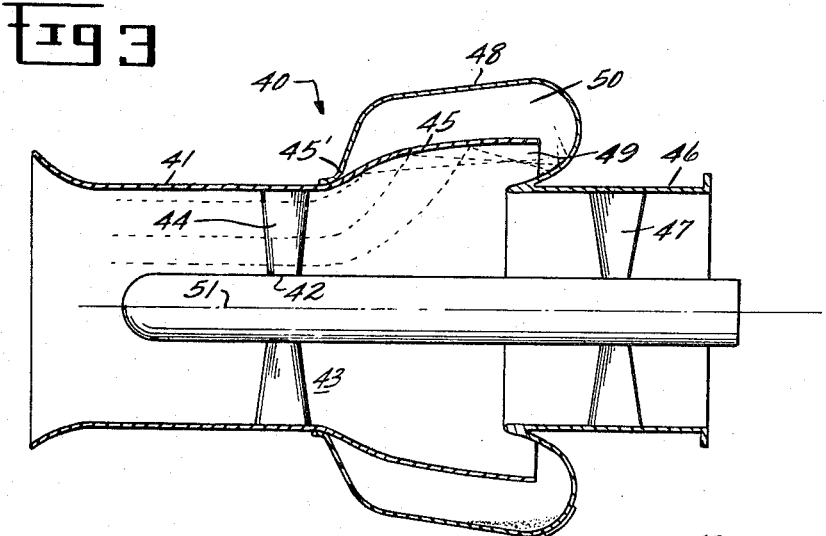
FIG. 3 is a cross sectional view of a separator formed in accordance with the present invention in which one of the wall members is contoured so as to be a focusing wall.
Figure 4:
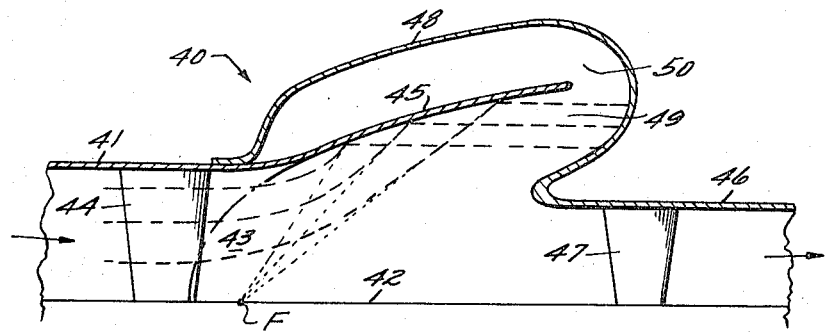
FIG. 4 is a view similar to FIG. 3 in which the focusing wall has the contour of a paraboloid of revolution.
Figure 5:
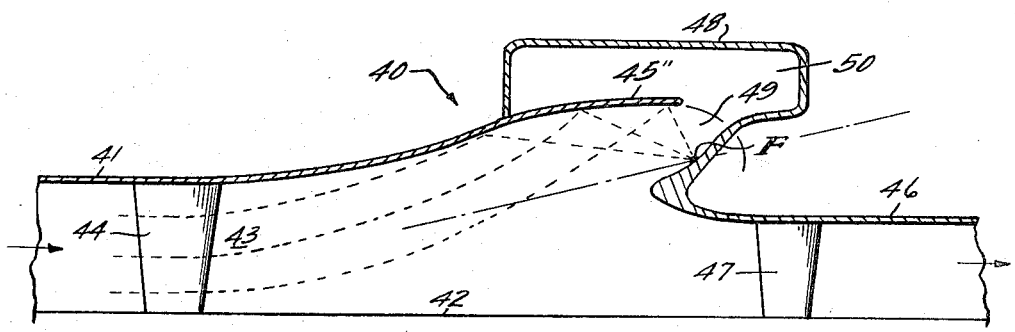
FIG. 5 is a view similar to FIG. 4 in which the wall contour is that of a modified paraboloid of revolution.

Axial flow separators having slightly modified configurations are illustrated by FIGS. 3–5. With reference first to FIG. 3, a separator 40 is basically similar to the one illustrated by FIGS. 1 and 2 in that it has a housing 41 and an inner fairing 42 defining therebetween an axial passageway 43, inlet swirl vanes 44, a first diverging wall member 45, a second cylindrical wall member 46, and outlet deswirl vanes 47. A casing 48 circumferentially surrounds an annular extraction slot 49 formed by the first and second wall members, the casing 48 enclosing a storage space 50 for receiving the extracted material from the slot 49. Instead of being of frusto-conical shape, the diverging wall member 45 is contoured so as to be a focusing wall for directing particles striking the wall into the extraction slot 49. The wall member 45 is contoured to take advantage of the well-known natural law that an object striking a smooth surface will be reflected at an angle equal to the angle of incidence. In a given separator having a known swirl pattern, an optimum wall contour can be generated experimentally since any particular portion of the wall surface will be struck repeatedly by particles having substantially identical trajectories. As a result, there will be an optimum divergence or local slope at each portion of the wall for directing particles striking that portion into the annular extraction slot. The locus of all of these local slopes thus defines the optimum contour for the entire wall surface.

From the foregoing, it will be evident that different optimum wall contours may be required under various conditions. With the basic concepts understood, optimum wall contours for various applications may be generated both mathematically and experimentally. In determining the required contour of a focusing wall, various factors should be considered. These factors include the nature of the fluid in which the extraneous matter is entrained, the type of particles, their mass, velocity, radial distribution, etc. The turning configuration of the swirl vanes is, of course, an important factor to be considered.

Under certain conditions, the wall contours illustrated by FIGS. 4 and 5 may be indicated as being optimum, each wall contour being substantially that of a section of a paraboloid of revolution. The separator illustrated by FIG. 4 is similar in many respects to the separator of FIG. 3; accordingly, similar elements are designated by identical numerals. In the separator of FIG. 4, the first wall member 45' has a configuration or contour which is substantially that of a paraboloid of revolution having an axis of symmetry coincident with the longitudinal axis of the separator 40. Assuming for a moment that the surface of the wall 45' is precisely that of a paraboloid having its focal point at F, it will be evident from well-known mathematical and physical properties that an object travelling a straight-line path (see dotted lines) from the focal point F to any point on the surface will be reflected along a path parallel to the axis 51. With this in mind, two dimensional representations of the actual trajectories, under certain conditions, of the particles of extraneous matter are illustrated by broken lines. It will be noted that these trajectories strike the wall 45' at approximately the same angles as the dotted lines passing through the focal point F. Consequently, the extraneous particles are also reflected at paths generally parallel to the axis 51 and thus into the slot 49.

Under other conditions, the actual trajectories may take the form illustrated by broken lines in FIG. 5. In the separator of FIG. 5, which has identifying numerals identical to the separators of FIGS. 3 and 4, the particles of extraneous matter approach the surface of the diverging wall member 45" in substantially parallel paths. When viewed in cross-section, it will be noted that diametrically opposite wall portions have the configuration of a portion of a parabola having its focus F in the slot 49 and its axis A parallel to the trajectories of the approaching particles. The entire wall surface has the contour generated by rotating such a parabola about the longitudinal axis 51 of the separator 40. For convenience, the surface thus generated may also be referred to as being a section of a paraboloid of revolution.

The foregoing analyses with respect to the separators 40 of FIGS. 3-5 are somewhat crude in that it is assumed that the particles are travelling in only two dimensions where they are actually being swirled about the axes 51 in addition to having axial and radial motion. Nevertheless, it has been found that the above approaches are quite accurate in determining optimum wall configurations under various operating conditions.

The separators 40 of FIGS. 3-5 also differ from the separator 12 in that they do not have means for drawing particles out of the storage space 50 during engine operation. It has been found that the extraneous matter may be allowed to collect during operation and then removed after the engine is shut down. In such a design, it may be desirable to provide baffles in the storage space for reducing turbulence therein. Since no air is extracted, the second wall member 46 may be of essentially the same diameter as the upstream end of the first wall members 45, 45' and 45".

Figure 6:
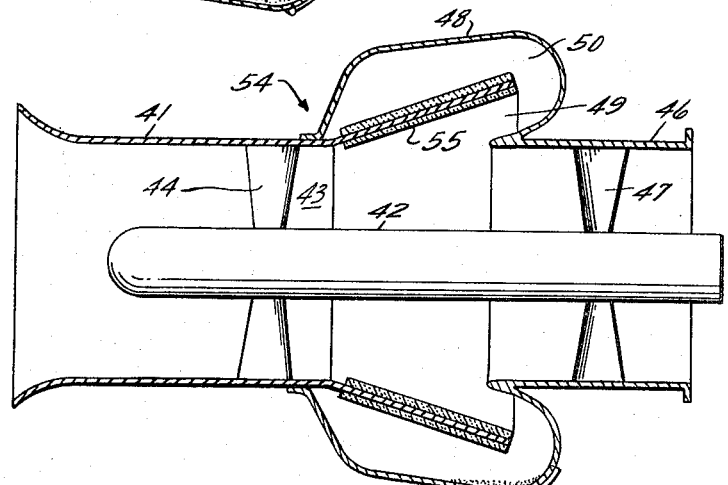
FIG. 6 is a view similar to FIG. 3 showing a separator in which one of the wall members is formed of an energy absorbing material.

In the separator embodiments illustrated by FIGS. 1-5, the diverging wall members control the angle of bounce of particles striking the walls, thereby directing the particles into the radial extraction slot. FIG. 6 illustrates a modified separator 54 in which a diverging wall 55 of frusto-conical shape is formed of an energy absorbing material which not only controls the angle of bounce but also reduces the amount of bounce. In all other respects, the separator 54 is identical to the separator 40 of FIG. 3, and for the purpose of clarity the other elements are given the same identifying numerals as in FIG. 3. To understand the operation of the separator 54, it will be remembered that the air stream and the entrained particles are travelling through the axial passageway 43 at high velocity. By forming the wall 55 of a yielding material which can absorb energy when struck by a high velocity particle, the velocity of the particle will be reduced substantially and the probability that the particle will enter the slot 49 will be increased proportionately. As an example of a suitable energy absorbing material for controlling the bounce of particles, the diverging wall 55 may be formed of well damped rubber or a high damping material with low coefficient of restitution.

Figure 7:
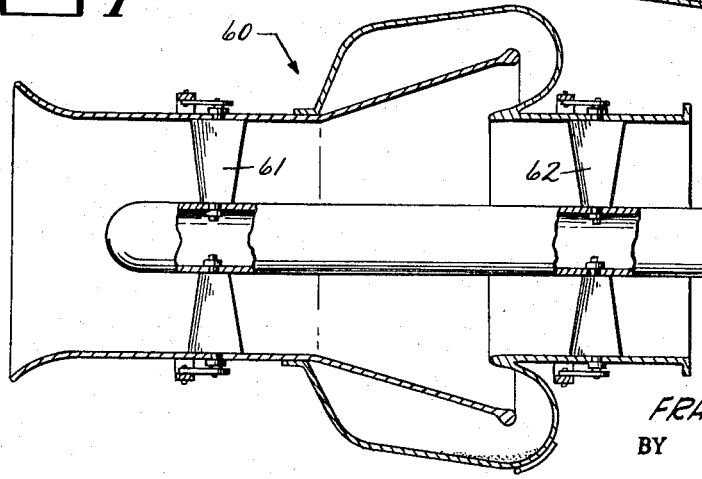
FIG. 7 is a view similar to FIGS. 3 and 4 illustrating a separator having adjustable vanes for producing and removing swirl.

At an earlier point in this specification, it was pointed out that the swirl and deswirl vanes have a desired turning configuration. With respect to the swirl vanes, it was explained that the turning configuration is such that entrained particles will reach the outer periphery of the fluid passageway in the axial interval between the upstream ends of the first and second wall members. It is extremely difficult to define the precise turning configuration with greater particularity since the configuration will depend in large measure on certain factors of the type discussed above with respect to the focusing wall, these including the nature of the fluid in which the extraneous matter is entrained, the type of particles, their mass, velocity, radial distribution, etc. Two configurations which would certainly receive consideration in the detailed design of any separator formed in accordance with the invention are free vortex and constant turning arrangements. A free vortex design produces high hub swirl and low tip swirl. In such a design, the hub swirl may be excessive while the tip swirl may be inadequate even though particles at the tip have only a short radial distance to traverse. Similarly, a constant turning design may produce excessive swirl at the tip and inadequate swirl at the hub. Consequently, it will be obvious to those skilled in the art that various swirl patterns may be required for optimum separating results under different conditions. With respect to the deswirl vanes, the turning configuration may be defined under most operating conditions to be that required to remove the swirl produced by the swirl vanes. If, however, it is desired to combine the separator and the gas turbine engine into an integral assembly, the inlet guide vanes to the compressor may be deleted. In such a case, the deswirl vanes should direct the air stream to the rotating compressor blades in the manner generally accomplished by the inlet guide vanes. A separator 60 having adjustable inlet swirl vanes 61 and outlet deswirl vanes 62 is illustrated by FIG. 7, the vane angles being adjustable to vary the amount of swirl produced and removed under different operating conditions. By having adjustable swirl and deswirl vanes, the separator 60 is capable of effective separation over a much wider range of operating conditions than would otherwise be possible. In addition, by setting the vanes 61 and 62 so that no swirl is imparted to the air stream, the gas turbine engine powerplant may operate efficiently with minimum losses under conditions where the separating function is not required, such as operation at high altitudes where extraneous matter is not present in the atmosphere.

From the foregoing it will be seen that the improved axial flow separator of this invention is highly efficient in removing small particles of extraneous matter from a fluid stream without causing excessive pressure losses in the fluid stream. In addition to being highly effective, the separator of this invention is lightweight and compact and is therefore particularly suited for aircraft applications. Also, since it has no rotating parts and operates at ambient temperature only, the separator is relatively uncomplicated and may be fabricated from materials not having high temperature operational capabilities. As a result, the separator is a relatively inexpensive component, both to manufacture and to maintain.

While preferred embodiments of the invention have been illustrated and described above, it will be understood that various changes and modifications may be made without departing from the spirit and scope of the invention, and it is intended to cover all such changes and modifications by the appended claims.

What is claimed as new and is desired to secure by Letters Patent of the United States is:

1. In a gas turbine engine assembly including a compressor, a combustor, and a turbine in serial flow arrangement, a separator for removing extraneous matter from the stream of air supplied to the compressor, said separator comprising:
   means defining an axially extending annular passageway having at opposite ends thereof an annular inlet and an annular outlet communicating with the compressor,
   a row of circumferentially spaced radially extending turning vanes adjacent said inlet for imparting swirl to the air stream flowing through said passageway,
   outer wall means downstream of said swirl producing vanes defining collection means for receiving extraneous matter,
   said collection means comprising a first annular wall member diverging downstream from said radial turning vanes and a second annular wall member coaxially mounted with respect to said first wall member,
   the upstream end of said second wall member being located downstream of the upstream end of said first wall member and being of substantially smaller diameter than the axially corresponding portion of said first wall member such that an annular extraction slot having substantial radial extent is defined between said first and second wall members,
   a casing circumferentially surrounding said extraction slot to form storage space in fluid communication with said extraction slot for receiving extraneous matter therefrom,
   and a row of circumferentially spaced radially extending turning vanes immediately adjacent said outlet for removing swirl from the air stream before the air stream is supplied to the compressor.

2. An axial flow separator for a gas turbine engine assembly as defined by claim 1 in which said first wall member is a focusing wall contoured so as to direct extraneous matter striking said first wall member into said extraction slot.

3. An axial flow separator for a gas turbine engine assembly as defined by claim 1 in which the upstream ends of said first wall member and said second wall member have substantially the same diameter.

4. An axial flow separator for a gas turbine engine assembly as defined by claim 1 having engine driven pump producing means in fluid communication with said storage space for removing extraneous matter therefrom during operation of said separator.

5. An axial flow separator for a gas turbine engine assembly as defined by claim 1 in which said swirl producing vanes and said swirl removing vanes include adjusting means such that the amount of swirl produced and removed may be varied.

6. In a gas turbine engine assembly including a compressor, a combustor, and a turbine in serial flow arrangement, a separator for removing extraneous matter from the stream of air supplied to the compressor, said separator comprising:
   means defining an axially extending annular passageway having at opposite ends thereof an annular inlet and an annular outlet communicating with the compressor,
   means adjacent said inlet for imparting swirl to a fluid stream flowing through said passageway,
   and collection means for receiving extraneous matter spaced axially downstream of said swirl producing means,
   said collection means including at least one extraction slot formed in a transverse plane to the surface of the outer periphery of said passageway and adjacent thereto,
   the flow area of said passageway downstream of said collection means being substantially the same as the flow area upstream of said collection means.

7. For removing extraneous matter from a fluid stream, a separator comprising:
   means forming an axially extending passageway having an inlet and an outlet at opposite ends thereof,
   means adjacent said inlet for imparting swirl to a fluid stream flowing through said passageway,
   outer wall means downstream of said swirl producing means defining at least one collection means for receiving extraneous matter,
   said collection means comprising a first annular wall member diverging axially downstream from said swirl producing means and a second annular wall member coaxially mounted with respect to said first wall member,
   the upstream end of said second wall member being located downstream of the upstream end of said first wall member and being of substantially smaller diameter than the axially corresponding portion of said first wall member such that an annular extraction slot having substantial radial extent is defined between said first and second wall members,
   and means immediately axially downstream of said collection means for removing swirl from the fluid stream.

8. An axial flow separator as defined by claim 7 in which said first wall member is a focusing wall contoured so as to direct extraneous matter striking said first wall member into said extraction slot.

9. An axial flow separator as defined by claim 7 in which storage means is provided in fluid communication with said extraction slot for receiving extraneous matter therefrom.

10. An axial flow separator as defined by claim 11 having pump producing means in fluid communication with said storage means for removing extraneous matter therefrom during operation of said separator.

11. For removing extraneous matter from a fluid stream, a separator comprising:
   means defining an axially extending annular passageway having an annular inlet and an annular outlet at opposite ends thereof, a row of circumferentially spaced radially extending turning vanes adjacent said inlet for imparting swirl to a fluid stream flowing through said passageway,
said swirl producing vanes being adjustable so that the amount of swirl produced can be varied,
outer wall means downstream of said swirl producing means defining collection means for receiving extraneous matter,
said collection means comprising a first annular wall member diverging axially downstream from said radial turning vanes and a second annular wall member coaxially mounted with respect to said first wall member,
the upstream end of said second wall member being substantially aligned axially with and being of substantially smaller diameter than the downstream end of said first wall member such that an annular extraction slot having substantial radial extent is defined between said first and second wall members,
said first wall member being a focusing wall contoured so as to direct extraneous matter striking said first wall member into said extraction slot,
and a row of circumferentially spaced radially extending turning vanes adjacent said outlet for removing swirl from the fluid stream,
said swirl removing vanes being adjustable so that the amount of swirl removed can be varied.

12. An axial flow separator as defined by claim 11 in which the contour of said first wall member is substantially that of a segment of a paraboloid of revolution.

13. An axial flow separator as defined by claim 11 in which the upstream ends of said first wall member and said second wall member have substantially the same diameter.

14. For removing extraneous matter from a fluid stream, a separator comprising:
means defining an axially extending annular passageway having an annular inlet and an annular outlet at opposite ends thereof,
a row of circumferentially spaced radially extending turning vanes adjacent said inlet for imparting swirl to a fluid stream flowing through said passageway,
and outer wall means downstream of said swirl producing vanes defining collection means for receiving extraneous matter,
said collection means comprising a first annular wall member diverging axially downstream from said radial turning vanes and a second annular wall member coaxially mounted with respect to said first wall member,
the upstream end of said second wall member being located downstream of the upstream end of said first wall member and being of substantially smaller diameter than the axially corresponding portion of said first wall member such that an annular extraction slot having substantial radial extent is defined between said first and second wall members, and
said first wall member is formed of an energy absorbing material to control bouncing of extraneous matter striking said first wall member.

References Cited
UNITED STATES PATENTS

| | | | |
|---|---|---|---|
| 1,124,199 | 1/1915 | Bickel | 55—414 |
| 2,393,112 | 1/1946 | Lincoln | 55—416 |
| 2,487,633 | 11/1949 | Breslove | 55—416 |
| 2,636,666 | 4/1953 | Lombard | 230—132 |
| 2,647,588 | 8/1953 | Miller. | |
| 2,688,378 | 9/1954 | Perrin | 55—396 |
| 2,732,032 | 1/1956 | Sandison | 55—439 |
| 2,802,618 | 8/1957 | Prachar | 230—132 |

HENRY F. RADUAZO, *Primary Examiner.*